UNITED STATES PATENT OFFICE.

CORNELIUS D. VREELAND, OF UPPER MONTCLAIR, NEW JERSEY.

PIGMENT.

SPECIFICATION forming part of Letters Patent No. 691,423, dated January 21, 1902.

Application filed August 14, 1900. Serial No. 26,826. (No specimens.)

*To all whom it may concern:*

Be it known that I, CORNELIUS D. VREELAND, a citizen of the United States, late of Chicago Heights, in the county of Cook, in the State of Illinois, but now residing at Upper Montclair, in the county of Essex, in the State of New Jersey, have invented a new and useful Improvement in Paints and Processes of Making the Same; and I do hereby declare that the following is a full, clear, and exact description of the same.

This invention relates to the utilization in the manufacture of paint of the waste material or sludge which is a by-product in the manufacture of sulfate of alumina (which is known in commerce as "paper-makers' alum," "filter-alum," "concentrated alum," "alum cake," &c.) from bauxite by what is known as the "acid" process, my said invention comprising a novel paint as a new and useful article of manufacture and also a process of making the same.

Bauxite, as is well known, is composed of hydroxid of aluminium, together with silica, oxids of iron and titanium, &c., as will be seen by reference to works treating of the material from which alum is produced. (See, e. g., The Mineral Industry of the United States, New York and London, 1899, Vol. 7, pages 13 et seq.) Commercial bauxite contains, besides the aluminium, oxid and hydrate of silica, varying between certain limits, and iron oxid. The acid sludge of course contains therewith sulfuric acid. When the bauxite is treated with sulfuric acid, as in the process aforesaid, the resultant sulfate of alumina remains in solution. Upon being allowed to settle this solution deposits a precipitate. The solution being then filtered, there remains on the filter a further deposit, which differs in no essential degree from the precipitate and which, as is also the case with the precipitate, I term "sludge." The sludge from the filter is mingled, when desired, with that resulting from precipitation, as aforesaid. The sludge, by reason of the sulfuric acid used in the production of the sulfate-of-alumina solution, has an acid reaction. For the purposes of my invention the acid in the sludge must be neutralized. This is done by adding milk of lime, which chemically neutralizes the acid. To the material thus rendered neutral I add oxid of zinc in the proportions of, say, fifteen to fifty per cent. of what would be the weight of the sludge if dry. The resultant product is then dried in any suitable manner to a degree which renders it capable of being ground in oil. I then grind the combined sludge and oxid of zinc product together with oil. I thus provide a paint the characteristic and useful constituents of which are dried neutral sludge from the bauxite, (treated by the acid process, as aforesaid) zinc oxid, and oil. This paint has superior qualities of permanence and durability and an excellent "spreading" property, which adds very greatly to its utility. The proportion in the paint of oxid of zinc to the dry neutral sludge is to a considerable degree arbitrary. As a rule, however, the increased spread of the neutral sludge is approximately in the ratio of the percentage of oxid of zinc up to about fifty per cent. as aforesaid.

The coöperation of the elements in the production of the aforesaid paint product is as follows: The necessity of neutralizing the acid in the sludge is met by the addition of the lime. This, however, produces a proportion of calcium sulfate which is non-opaque and which therefore relatively diminishes the opacity of the neutralized sludge. The non-opacity of the calcium sulfate is rectified by the zinc oxide which restores to the product the full degree of opacity of the original sludge, thereby enabling the lime to be used for neutralizing the acid in the sludge without deteriorating the latter in other respects. Additional to this the oxid of zinc also serves as a meritorious component of the paint.

It is to be observed that as dry neutral powdered product resulting from the production of sulfate of alumina from bauxite by the acid process and also the paint made by grinding dried neutral sludge derived from the production of sulfate of alumina from bauxite by the acid process in oil are set forth and covered in my application for a patent, Serial No. 26,825, of August 14, 1900, the same are not claimed in this my present application; but What I herein claim as my invention is—

1. As a new article of manufacture a paint composed of dried sludge derived from the production of sulfate of alumina from bauxite by the acid process and which has been neutralized by the addition of lime, combined with oxid of zinc and the two together ground with oil, as set forth.

2. The process of making a novel paint which consists in neutralizing with milk of lime the acid sludge which results from the manufacture of sulfate of alumina from bauxite by the acid process, combining oxid of zinc with the thus-neutralized sludge, drying the material, and grinding the same with oil, as set forth.

CORNELIUS D. VREELAND.

Witnesses:
DANIEL S. DECKER,
JAMES A. WHITNEY.